No. 634,577. Patented Oct. 10, 1899.
H. HURLBURT.
REVOLVING ELEVATOR OR DERRICK CRANE.
(Application filed June 10, 1899.)
(No Model.) 2 Sheets—Sheet 1.
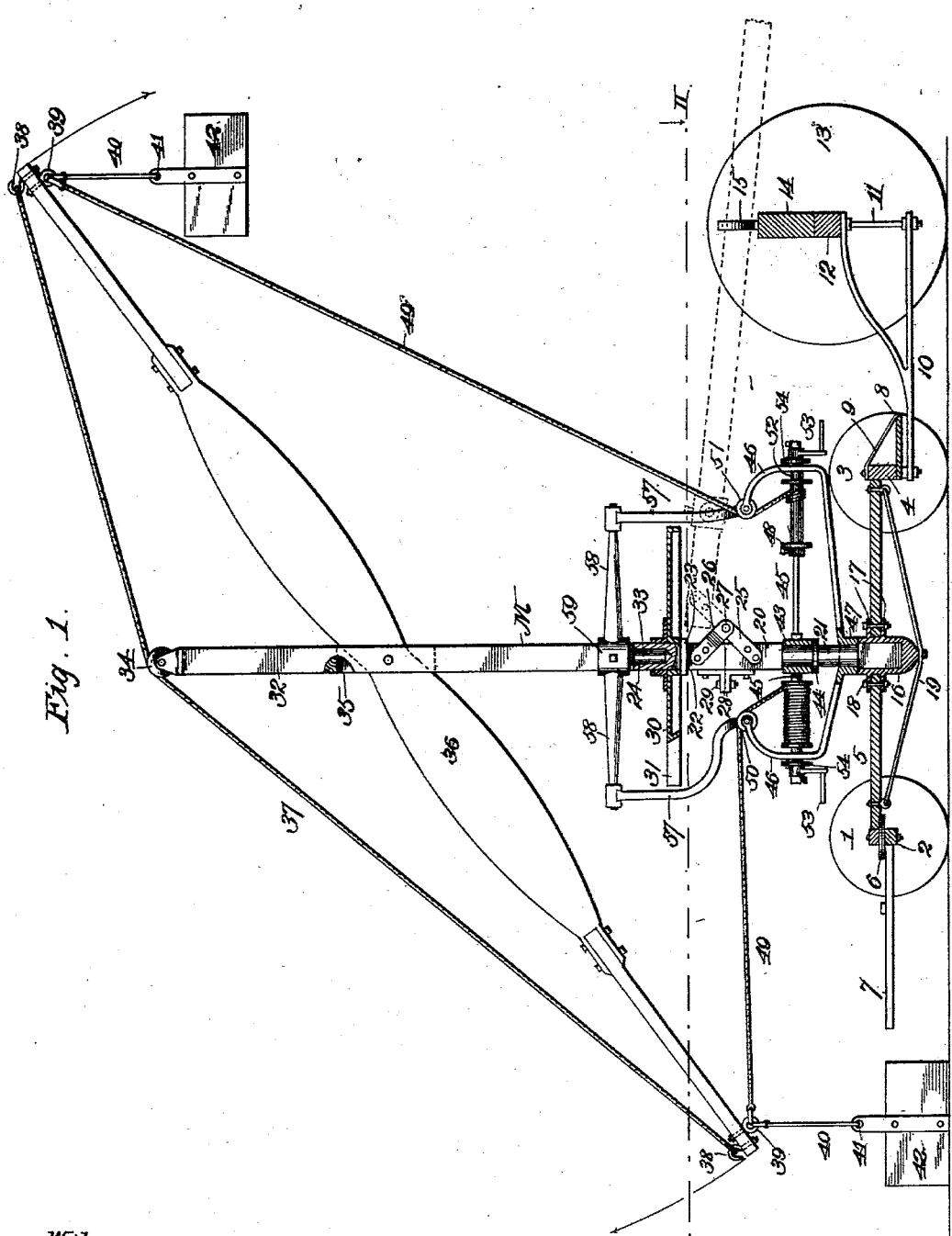
Witnesses:
M. R. Remby
H. C. Rodgers
Inventor:
Horace Hurlburt
By Higdon, Fischer & Thorpe
attys.

No. 634,577. Patented Oct. 10, 1899.
H. HURLBURT.
REVOLVING ELEVATOR OR DERRICK CRANE.
(Application filed June 10, 1899.)
(No Model.) 2 Sheets—Sheet 2.
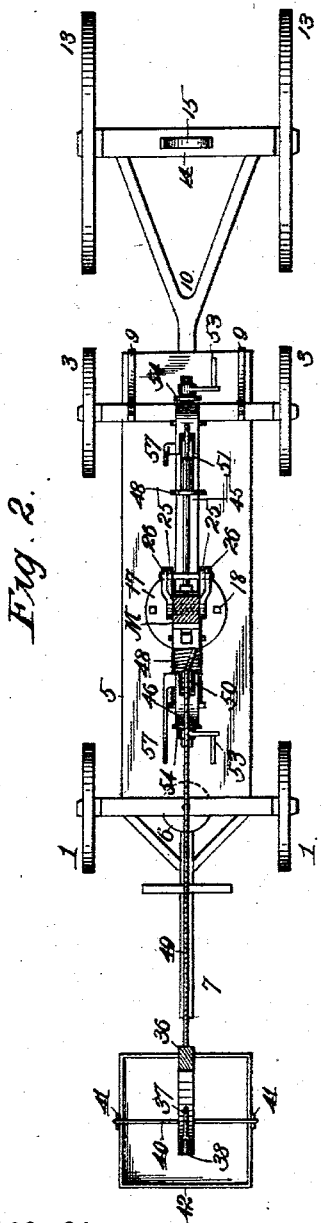
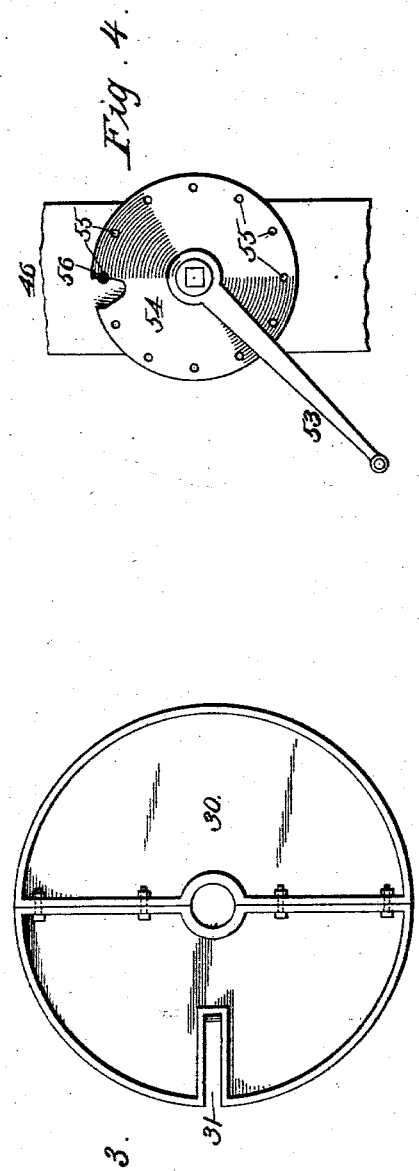
Witnesses:
M. P. Remley,
H. C. Rodgers.
Inventor
Horace Hurlburt
By Higdon, Fischer & Thorpe
attys.

UNITED STATES PATENT OFFICE.

HORACE HURLBURT, OF LEAVENWORTH, KANSAS.

REVOLVING ELEVATOR OR DERRICK-CRANE.

SPECIFICATION forming part of Letters Patent No. 634,577, dated October 10, 1899.

Application filed June 10, 1899. Serial No. 720,061. (No model.)

*To all whom it may concern:*

Be it known that I, HORACE HURLBURT, of Leavenworth, Leavenworth county, Kansas, have invented certain new and useful Improvements in Revolving Elevators or Derrick-Cranes, of which the following is a specification.

My invention relates to portable revolving elevators or derrick-cranes; and it consists in certain novel and peculiar features of construction and combinations of parts, as will be hereinafter described and claimed.

The object of the invention is the provision of a portable device which may be utilized for business or pleasure, as a means for elevating and discharging freight at any desired point, or as a means for whirling a party on pleasure bent around in the air.

In order that the invention may be fully understood, reference is to be had to the accompanying drawings, in which—

Figure 1 represents a view, partly in elevation and partly in vertical section, of a portable elevator or derrick-crane constructed in accordance with my invention. Fig. 2 is a horizontal section taken on the line II II of Fig. 1. Fig. 3 is an enlarged inverted plan view of the platform upon which the operator walks to revolve the device. Fig. 4 is a detail view, enlarged, to show the means for maintaining an object at any desired altitude.

In the said drawings, 1 designates the front wheels, connected by the axle 2, and 3 the rear wheels, connected by the axle 4, and said axles are in turn connected by a bed-plate 5, having a pivoted connection with the front axle through the medium of the fifth-wheel 6, and projecting forward from said front axle is the tongue 7, to which draft-animals may be hitched in the usual or any preferred manner when it is desired to move the machine.

8 designates a rear platform secured to the rear axle and braced by the inclined bars 9, and connected to said rear axle is a forked frame 10, having its rear ends connected to the bolts 11, (one only of which appears,) depending from the axle 12 of a pair of large wheels 13, a bolster 14 being secured to the axle and provided with a fork or guide 15 for a purpose which hereinafter appears.

16 designates a cast-metal socket-tube extending down through the center of the bed-plate 5 and provided with a pair of outwardly-projecting flanges 17, embracing and united to the bed-plate by means of the bolts 18, and as this bed-plate is designed to receive a comparatively heavy weight said bed-plate is trussed by means of the truss-rod 19 extending through the lower end of the socket-tube and having its ends bolted to the bed-plate near the front and rear ends of the latter.

M designates generally the mast, composed of the sectional stationary lower portion and an upper revolving portion. The stationary lower portion consists of the rectangular part 20, seated at its lower end in the correspondingly-formed socket-tube and of cylindrical formation at its middle, as at 21, and the superposed rectangular part 22, formed with a shoulder or enlargement 23 and a vertical hole or recess 24 in its upper end. The part 22 is hinged to the part 20 by means of the plates 25 26, pivoted together at their outer ends, as at 27, so that the upper part of the mast may fold down to the position shown in dotted lines, Fig. 1, and rest in the guide-bracket 15. In order to secure the mast in its vertical position, however, the parts 20 and 22 are provided with the similar angle-plates 28, normally bolted together, as shown at 29, and in order that the operators whose business it is to revolve the upper portion of the mast may accomplish the same with the least difficulty I mount a circular platform 30 upon the rectangular upper part 22 of the stationary or lower section of the mast, said platform resting upon the enlargement 23, provided at a suitable point with a radial recess 31 for a purpose which hereinafter appears.

32 designates the upper or revolving portion of the mast, provided with a depending cylindrical stem 33, journaled in the vertical hole or recess 24. The rotatable portion of the mast is furthermore provided with a guide-sheave 34 at its upper end and with an opening or recess 35, through which extends and is pivoted to operate vertically the walking-beam 36, said beam being braced or trussed by means of the cable or rope 37, which extends over the guide-sheave 34 and is secured at its opposite ends to the guide bolts or hooks 38, projecting from the ends of the walking-beam.

Suspended from a pair of eyebolts 39, secured to the ends of the walking-beam, are the links 40, pivoted, as at 41, to the arms of the baskets, cages, or platforms 42, adapted to receive human or any other kind of freight. In order that motion may be imparted to this walking-beam to cause it to oscillate upon its pivot, I journal a sleeve 43 upon the cylindrical portion 21 of the lower or stationary part of the mast and support said sleeve by means of a collar 44, said sleeve being provided or formed with a pair of stub-shafts 45, projecting forwardly and rearwardly and supported at their outer ends by means of the arms 46 of the sleeve 47, journaled also upon said part 21 of the mast and resting upon the upper end of the socket-tube. A pair of drums 48 are journaled upon said stub-shafts 45 and are connected to the eyebolts 39 of the walking-beam by means of the cables 49, said cables extending around the guide-sheaves 50 and 51, respectively, carried by the front and rear arms 46 of rotatable sleeve 47. The drums are provided with tubular extensions 52, which project through the arms 46 and are provided with crank-arms 53 at their outer ends and inward thereof with the disks 54, provided with a circular series of openings 55, through one or the other of which and the registering hole in the corresponding arm 46 a locking-pin 56 extends to lock the drums at the desired point of adjustment, and consequently lock the walking-beam, with its baskets 42, at the desired elevation.

As it is necessary in the revolution of the upper part of the mast that the mechanism for oscillating the walking-beam and the sleeves carrying said mechanism shall rotate synchronously, the arms 46 are connected by the arms 57 to the outer ends of the handles 58 of a sleeve 59, fitting upon the squared portion of the rotatable or upper portion of the mast, which handles 58 form a convenient means for an operator or a pair of operators upon platform 30 to impart rotatable movement to the mast and the connected parts, said operator simply grasping the handle 58 and pushing the same before him as he walks around on the platform in the direction in which the mast is to revolve.

Supposing the device is to be used as a "whirl-around," the walking-beam is operated to dispose one of the baskets or cars upon the ground. The passengers are arranged comfortably in this basket, and then the position of the walking-beam is reversed by an operator standing on the platform 5 at its front end and an operator standing on the platform 8, said operators turning the drums in the proper direction, as will be readily understood, until the unloaded car is on the ground. The passengers for this basket step in, and then the drums are manipulated until the walking-beam assumes a horizontal position, if desired, at which point it is locked by the insertion of the locking-pins 56 through the registering holes 55 and the holes in the sleeve-arms 46. The operators now step upon the platform 30 at opposite sides of the handle and, walking forward, push the handle around in front of them, and thereby cause the upper portion of the mast, together with the parts connected thereto and mounted rotatably upon the lower or stationary part of the mast, to revolve at the desired speed. Should it be desired to elevate as high as possible the basket 42 at the front side of the mast, it is obvious that the corresponding cable 49 will enter the slot 31 of the platform 30, so that the latter shall not interfere with the operation, as it undoubtedly would if such slot were not provided by reason of the forward drum being located so close to the mast. By reference to Fig. 1 it will be seen that when the front cable 49 extends upward through the guide-sheave 50 at the same angle that the companion cable extends in said figure it will pass freely through the slot 31.

When the machine is to be transported, the walking-beam is first removed, and then the rotatable part of the mast removed from the stationary part in order that the platform 30 may be removed. The rotatable part of the mast is then replaced in its original position and the connecting-bolt uniting angle-plates 28 removed, so that the entire upper portion of the mast may be lowered to the position shown in dotted lines, it being necessary, of course, before this can be accomplished that the arms 57 be spread apart sufficiently to permit the sleeve 59, provided with handles 58, to be disconnected from said arms. The dismantled parts of the machine may then be loaded upon the wheeled frame at opposite sides of the mast, and in this condition the machine may be as conveniently conveyed from place to place as the ordinary field-pieces used by the army.

From the above description it will be apparent that I have produced a machine of the character described which possesses the features of advantage enumerated as desirable in the statement of invention and which is of simple, durable, and comparatively cheap construction, and while I have illustrated the preferred embodiment of my invention I wish it to be understood that I reserve the right to make any and all changes in the same which do not involve a departure from the spirit and scope of the invention.

Having thus described the invention, what I claim as new, and desire to secure by Letters Patent, is—

1. A revolving elevator or derrick-crane, comprising a mast consisting of a stationary lower portion and a rotatable upper portion, a walking-beam pivoted to the upper portion and carrying baskets or platforms at its outer ends, a sleeve journaled upon the lower portion of the mast, a sleeve secured upon the upper or removable portion of the mast and provided with handles connected to the first-named sleeve, and a platform secured to the stationary part of the mast below said handles, substantially as described.

2. A revolving elevator or derrick-crane, comprising a mast consisting of a stationary lower portion and a rotatable upper portion, a walking-beam pivoted to the upper portion and carrying baskets or platforms at its outer ends, a sleeve journaled upon the lower portion of the mast, a sleeve secured upon the upper or removable portion of the mast and provided with handles connected to the first-named sleeve, a platform secured to the stationary part of the mast below said handles, means to operate said walking-beam, and means to secure the walking-beam at any desired point of adjustment, substantially as described.

3. A revolving elevator or derrick-crane, comprising a mast consisting of a stationary lower portion and a rotatable upper portion, a walking-beam pivoted to the upper portion and carrying baskets or platforms at its outer ends, a sleeve journaled upon the lower portion of the mast, a sleeve secured to the upper or rotatable portion of the mast and provided with handles connected to the first-named sleeve, a platform secured to the stationary part of the mast below said handles, a pair of rotatable drums suitably journaled, cables suitably connecting said drums with the outer ends of the walking-beam, and means to lock said drums from rotatable movement, substantially as described.

4. A revolving elevator or derrick-crane, comprising a wheeled frame, a mast erected vertically thereon and consisting of a lower stationary portion composed of two parts hinged together, and an upper or removable portion journaled in and upon the stationary portion, a walking-beam mounted in the removable portion, a sleeve mounted upon the removable portion and provided with handles, a sleeve journaled upon the stationary portion and provided with arms connected to said handles, and guide-sheaves journaled in said arms, a second sleeve journaled upon the stationary portion and provided with stub-shafts, drums journaled upon said stub-shafts, cables guided over said sheaves and connected at their opposite ends to said drums and the outer ends of the walking-beams, and baskets or platforms suspended from the outer ends of said walking-beam, substantially as described.

5. A revolving elevator or derrick-crane, comprising a wheeled frame, a mast erected vertically thereon and consisting of a lower stationary portion composed of two parts hinged together, and an upper or removable portion journaled in and upon the stationary portion, a walking-beam mounted in the removable portion, a sleeve mounted upon the removable portion and provided with handles, a sleeve journaled upon the stationary portion and provided with arms connected to said handles, and guide-sheaves journaled in said arms, a second sleeve journaled upon the stationary portion and provided with stub-shafts, drums journaled upon said stub-shafts, cables guided over said sheaves and connected at their opposite ends to said drums and the outer ends of the walking-beam, baskets or platforms suspended from the outer ends of said walking-beam, and a support trailing behind the wheeled frame and provided with a guide-bracket to receive the mast when it occupies its recumbent position, substantially as described.

In testimony whereof I affix my signature in the presence of two witnesses.

HORACE HURLBURT.

Witnesses:
M. R. REMLEY,
H. C. RODGERS.